United States Patent [19]
Blonder et al.

[11] Patent Number: 5,349,503
[45] Date of Patent: * Sep. 20, 1994

[54] ILLUMINATED TRANSPARENT DISPLAY WITH MICROTEXTURED BACK REFLECTOR

[75] Inventors: Greg E. Blonder, Summit; Bertrand H. Johnson, Murray Hill, both of N.J.

[73] Assignee: AT&T Bell Laboratories, Murray Hill, N.J.

[*] Notice: The portion of the term of this patent subsequent to Sep. 14, 2010 has been disclaimed.

[21] Appl. No.: 52,320

[22] Filed: Apr. 23, 1993

Related U.S. Application Data

[63] Continuation-in-part of Ser. No. 816,405, Dec. 31, 1991, Pat. No. 5,245,454.

[51] Int. Cl.$^5$ ............................................. F21V 8/00
[52] U.S. Cl. ........................................ 362/31; 359/70; 359/530; 359/546; 359/850
[58] Field of Search ................... 362/31, 26; 359/70, 359/530, 546, 627, 850, 851

[56] References Cited
U.S. PATENT DOCUMENTS 2,951,419  9/1960  Lemelson .
3,253,971  5/1966  Garling .
4,106,859  8/1978  Doriguzzi et al. .
4,185,895  1/1980  Stephens et al. .
4,249,801  2/1981  Masubuchi et al. .
4,431,272  2/1984  Yazawa et al. .
4,706,173  11/1987  Hamada et al. .
4,712,867  12/1987  Malek .
4,937,709  6/1990  Yanagi et al. ................... 362/31
4,991,940  2/1991  Dalisa et al. .
5,093,765  3/1992  Kashima et al. ................ 362/31
5,128,787  7/1992  Blonder .
5,161,873  11/1992  Obata ............................. 362/31

Primary Examiner—Richard R. Cole
Attorney, Agent, or Firm—Glen E. Books

[57] ABSTRACT

Applicants have discovered that a particularly efficient illuminating device for a transparent display comprises a microtextured reflecting surface formed on a major surface of a transparent substrate and a light source for directing light into the transparent substrate approximately parallel to the major surface. Preferably the substrate has two major surfaces separated by a thickness in the range 0.5 to 1.0 mm so that the substrate acts as a light guide. A substantial portion of the light passing into the substrate undergoes total internal reflection until it hits a microelement and is reflected out of the substrate. The result is an efficient illuminating device particularly useful for lighting transparent displays.

7 Claims, 3 Drawing Sheets

1

ILLUMINATED TRANSPARENT DISPLAY WITH MICROTEXTURED BACK REFLECTOR

RELATED APPLICATIONS

This application is a continuation-in-part of U.S. patent application Ser. No. 07/816405 entitled "LCD Display With Microtextured Back Reflector And Method For Making Same" filed in the name of Greg E. Blonder on Dec. 31, 1991 now U.S. Pat. No. 5,245,454.

TECHNICAL FIELD

This invention relates to illuminating devices, and, more particularly, to an illuminating device particularly useful for illuminating transparent displays such as liquid crystal displays (LCD). By transparent display, applicants refer to visual display devices wherein either the visual message portion of the display or the background portion is transparent or translucent.

BACKGROUND OF THE INVENTION

The combination of microelectronic circuits and low power liquid crystal displays (LCD displays) has led to a wide variety of portable electronic products. These products range from electronic watches to hand-held television receivers and lap top computers. Low power consumption is a critical requirement for each of them.

Despite their considerable utility in conjunction with integrated circuits, LCD displays have a number of shortcomings. In typical LCD cells the activated portion is darkened, representing a visual message, and the unactivated portion is transparent, constituting visual background. One shortcoming of LCD displays is the relatively low contrast between the activated portion and the unactivated portion. The contrast can be increased by backlighting the cell, thereby producing a sharp visual contrast between the portions of the cell darkened by activation and the light shining through the transparent regions. Unfortunately, conventional backlighting arrangements are inefficient. Even in so complex an electronic structure as a portable computer, the power used in display backlighting is the major drain on the system batteries.

The copending application Ser. No. 07/816405 discloses a microtextured reflector having dispersion characteristics of enhanced uniformity and a display device which can be read over an enhanced range of viewing angles. Specifically, a reflector comprises a base plane having a microtextured surface comprising a pattern of microelements having maximum lateral dimensions less than 125 micrometers and smooth continuous mold-formed surfaces arising from the base plane. A preferred reflecting surface is composed of closely packed, smooth-surfaced spherical segments having diameters of twenty-five microns and attitudes of four microns.

SUMMARY OF THE INVENTION

Applicants have discovered that a particularly efficient illuminating device for a transparent display comprises a microtextured reflecting surface formed on a major surface of a transparent substrate and a light source for directing light into the transparent substrate approximately parallel to the major surface. Preferably the substrate has two major surfaces separated by a thickness in the range 0.5 to 1.0 mm so that the substrate behaves as a light guide. A substantial portion of the light passing into the substrate undergoes total internal reflection until it hits a microelement and is reflected out of the substrate. The result is an efficient illuminating device particularly useful for lighting transparent displays.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
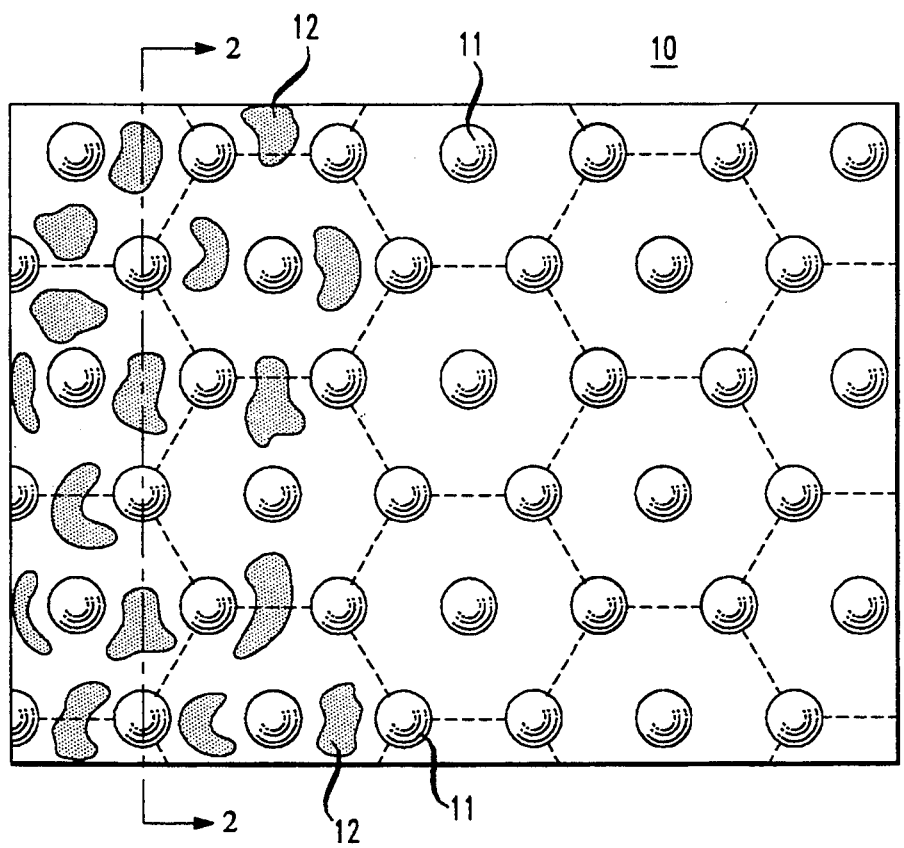
FIG. 1 is a top view of a preferred reflector surface useful with the invention.
Figure 2:
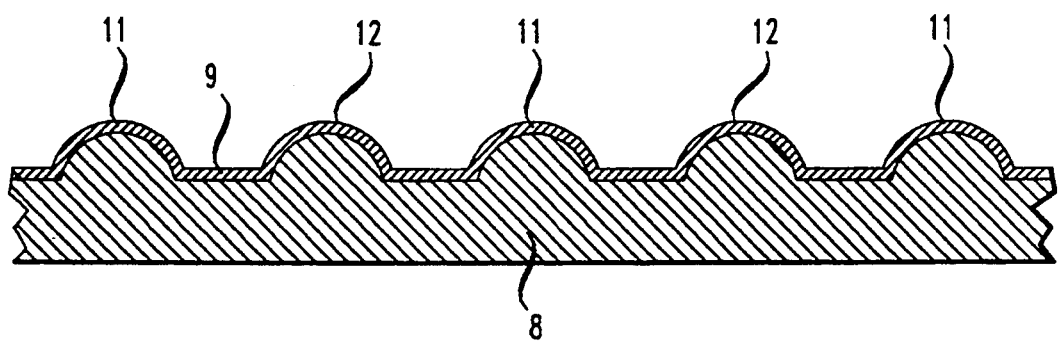
FIG. 2 is a schematic cross section of the reflector of FIG. 1.

Referring to the drawings, FIGS. 1 and 2 are schematic enlarged top and cross sectional views respectively of a preferred reflecting surface for use with the invention. Specifically, FIG. 1 shows a greatly enlarged top view of a microtextured reflector 10 comprising a pattern of microelements, each having smooth, continuous, mold-formed surfaces and maximum lateral dimensions along the plane of the surface of less than about 125 micrometers. Here the preferred pattern comprises a mixture of two microelements: spherical segments 11 and random segments 12. The bases of the spherical segments, as seen from a top view occupy 50 to 90% of the reflector surface and preferably 50 to 80%. As seen from the top the spherical segments occupy on the reflector plane, base circles of diameter in the range 10–125 microns, and preferably they all occupy bases of diameter 25±10 micrometers. Preferably the altitudes of the spherical segments (the perpendicular distances from the surfaces to the base planes) are within the range 10–20% of the diameters. The spherical segments can be randomly distributed but are preferably distributed in approximately an open hexagonal array.

The random segments 12 are microelements having irregularly shaped bases disposed between successive spherical microelements. The random segments preferably have no dimension exceeding 125 micrometers and lateral base dimensions comparable to the base diameters of the spherical segments.

The rationale for the preferred surface is as follows. If the surface consisted of a close-packed hexagonal array of spherical segments, then $\pi/2\sqrt{3} \approx 90\%$ of the base plane would be covered by the bases of the spherical segments. However the uniformity of the array could, under some lighting conditions, produce undesirable reflected "rainbow" effects due to diffraction. Moreover if the periodicity of the array were to match the periodicity of the pixels in an overlying LCD display, undesirable moire patterns could occur. However both of these problems can be avoided by randomizing the position of the reflecting segments.

Preferred, however, is to space the spherical segments apart by about their base diameters and to fill the interstices between them with elements of randomly shaped bases having lateral dimensions comparable to the base diameters of the spherical segments. Since the radii of curvature of these random elements are approximately the same as those of the spherical elements, their reflectance as a function of angle will be nearly the same.

As shown in FIG. 2, which is a schematic cross section of the FIG. 1 reflector along the line A', the spherical segments 11 and random segments 12 are advantageously molded or embossed into a plastic substrate 8, such as polymethyl methacrylate (PMM) coated with a reflecting material 9 such as aluminum. As can be seen from FIG. 2, while the bases of the random segments are irregular, the surfaces 12 extending up from the bases are preferably smooth and continuous.

Figure 3:
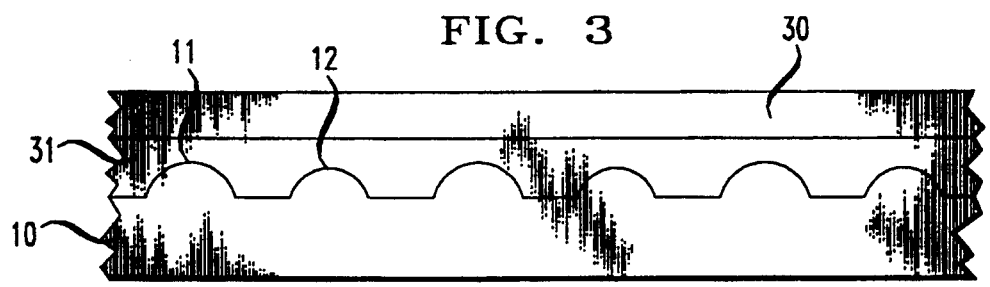
FIG. 3 is a schematic cross section of a transparent display having a back reflector of the type shown in FIGS. 1 and 2.

FIG. 3 is a schematic cross section of a transparent display using a microtextured back reflector of the type shown in FIGS. 1 and 2. Specifically, the display comprises a transparent display cell 30, such as an LCD cell, having a microtextured back reflector 10. Reflector 10 is bonded to cell 30 by transparent cement 31 such as transparent silicone rubber cement 31. This display is particularly useful as a display screen for a portable telephone where the angle of view is not fixed.

Figure 4:
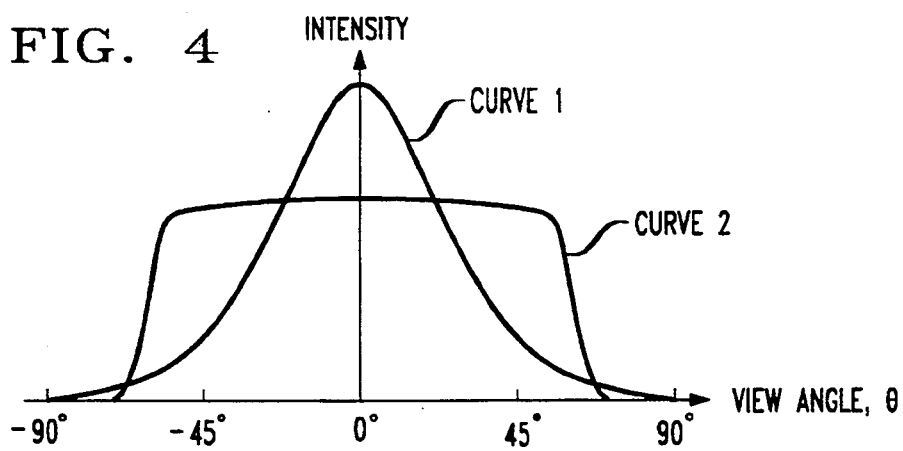
FIG. 4 is a graphical illustration showing the reflected intensity versus viewing angle of the reflector of FIGS. 1 and 2.

The advantages of the FIG. 3 visual display can be understood by reference to FIG. 4 which is a schematic graphical plot of reflected light intensity of the back reflector 10 versus angle of illumination $\theta$. Viewing at normal incidence is presumed. Curve 1 shows the intensity distribution for a conventional isotropic reflector, and Curve 2 shows the intensity distribution for a back reflector of the type shown in FIGS. 1 and 2.

As illustrated the peak reflected intensity for the conventional matte finished reflector is in the normal direction with $\theta = 0°$. This is precisely the angle of maximum glare from a visual display using the reflector. Thus much of the light reflected by the conventional reflector is reflected at an angle a viewer is not likely to use and therefore wasted.

In contrast, the back reflector of FIGS. 1 and 2 has a distribution which is relatively flat out to angles of 45° or more, at which angle intensity falls off very rapidly. Thus the reflector of FIGS. 1 and 2 when used in the display of FIG. 3 provides greater uniformity over a wider range of viewing angles. More specifically, the range of efficient reflection for the reflector of FIGS. 1 and 2 can be controlled by controlling the ratio of the altitude h of the spherical segments to their base plane diameter d. The greater h/d, the greater the radius of curvature and the larger the maximum reflected angle $\theta$. Specifically, $h/d = \frac{1}{2}\tan \theta/4$.

Figure 5:
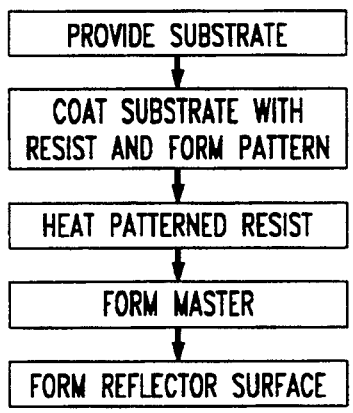
FIG. 5 is a flow diagram showing the steps involved in making the microtextured back reflector of FIG. 1.
Figure 6:
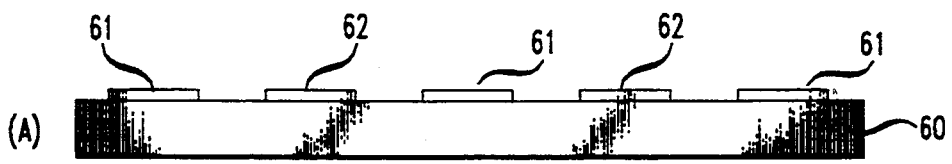
FIGS. 6 and 7 illustrate schematic cross sections of the structures made at various steps in the process of FIG. 5.

FIG. 5 is a block diagram showing the steps used in making a microtextured reflecting element of the type shown in FIGS. 1 and 2 FIG. 6 shows the structures produced at various stages of the FIG. 5 process.

The first step shown in FIG. 5A is to provide a substrate such as a silicon wafer (60 of FIG. 6).

As illustrated in FIG. 5B, the next step is to form on the substrate a planar pattern of photoresist corresponding to the bases of the spherical and random segments to be formed. This can be accomplished using conventional photolithographic processing. FIG. 6 shows the substrate 60 supporting adherent planar regions of photoresist 61 and 62 corresponding to the bases of spherical and random segments. Preferably the segments have a maximum lateral dimension of less than 125 micrometers. The photoresist can be AZ 1300 or AZ 1400 commercially marketed by Shipley Photoresist Co.

Figure 7:
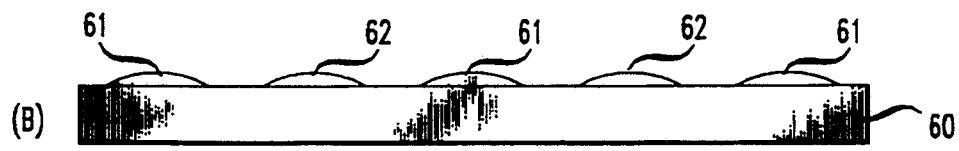

The third step shown in FIG. 5C is to heat the resist to form smooth continuous segments. For example heating developed AZ 1300 spots to 110° C. for a period of about 4 minutes produces smooth continuous profiles as shown in FIG. 7. The radius of curvature of the spherical segments formed by this process is uniquely determined by the thickness of the resist and the diameter of the base.

As shown in FIG. 5D, the fourth step is to form an embossing surface or mold conforming to the thus-formed surface. This can be accomplished, for example, by electroplating a few mils of nickel onto the surface of FIG. 7. The resulting textured nickel foil can, in turn, be laminated to a copper plate or roll. The final step shown in FIG. 5E is to use the textured surface to texture plastic material or metal foil. Plastic, in turn, can be provided with a reflecting surface of aluminum by vacuum evaporation, and the back reflector is complete.

Figure 8:
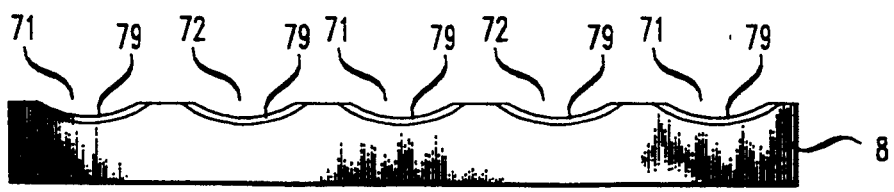
FIG. 8 is an alternative embodiment of a reflector.

FIG. 8 illustrates that microtextured reflective elements in accordance with the invention can be recessed into the body of the reflecting layer rather than projecting out from the body. Specifically, FIG. 8 is a cross section of a reflector wherein the reflective elements are inverted as compared with FIG. 2. Inverted spherical segments 71 and random segments 72 arrayed and dimensioned as described in connection with FIGS. 1 and 2 are molded or embossed into plastic substrate 8. In this particular embodiment the plastic is a transparent plastic and reflecting material 79 is selectively applied to the inverted reflective elements to form a transflective device capable of transmitting backlighting in light poor environments and reflecting light in light rich environments. Specifically, the uncoated transparent plastic regions transmit backlighting (not shown) and the reflecting elements 71 and 72 reflect ambient light. Such a transflective device is useful as a back reflector in the display of FIG. 3.

The reflecting material 79 can be selectively applied to the inverted elements by an electroplating process using a sensitizer. After the surface is formed on the plastic, the sensitizer is applied and the surface is subjected to buffing to selectively remove the sensitizer from the non-recessed regions. Electroplating will then selectively deposit reflecting material in the recessed regions where the sensitizer remains.

Figure 9:
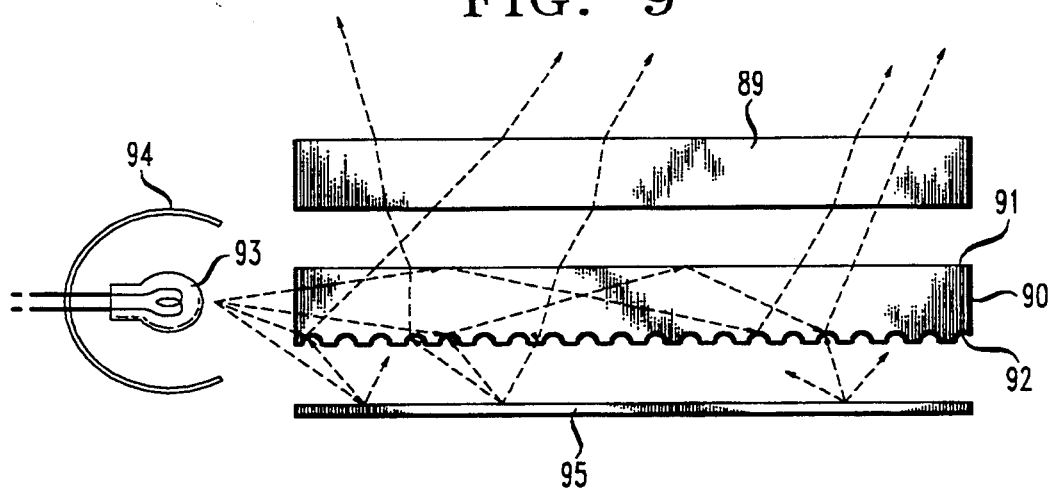
FIG. 9 is an embodiment of a reflector arrangement particularly useful in low light environments.

The microtextured reflecting material is particularly useful for applications in a light poor environment where supplemental lighting is required. FIG. 9 illustrates an illuminating device for providing lighting to a display 89. The device comprises a transparent substrate 90 having a pair of major surfaces 91 and 92. A microtextured surface is formed on at least one of the major surfaces—preferably the major surface 92 away from display 89. A light source comprising a lamp 93 and reflector 94 (preferably paraboloidal in cross section) is provided for directing light into the substrate 90 generally parallel to the microtextured surface 92. The substrate 90 preferably has a thickness between the major surfaces of about 0.5 to 1.0 mm so that the substrate acts as a light guide. Advantageously a diffusing surface 95 such as a white sheet is placed near the substrate on the side opposite display 89. With this arrangement, much of the light passing into the substrate moves through the substrate by total internal reflection until it hits a microelement and is reflected out of the substrate. The result is efficient back illumination for the display.

Figure 10:
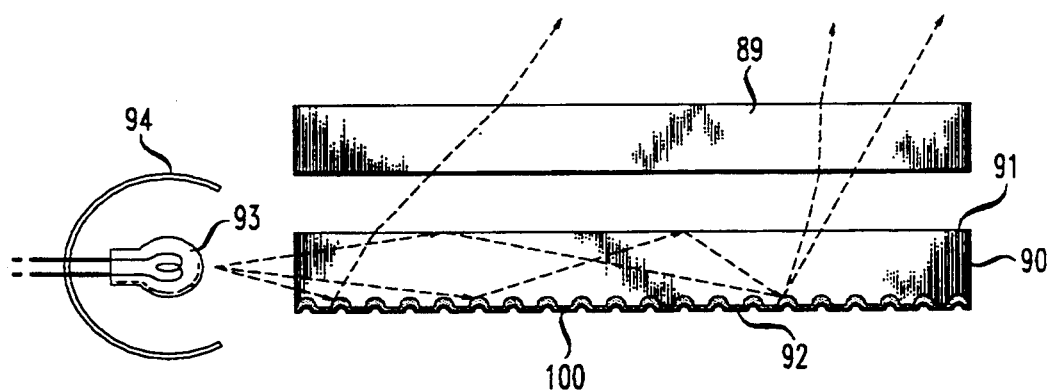
FIG. 10 is an alternative embodiment of a low light arrangement.

FIG. 10 is an alternative embodiment of a low light arrangement similar to that of FIG. 9 except the diffusing surface is omitted and the microtextured surface 92 is provided with a coating 100 of reflecting metal such as aluminum.

Figure 11:
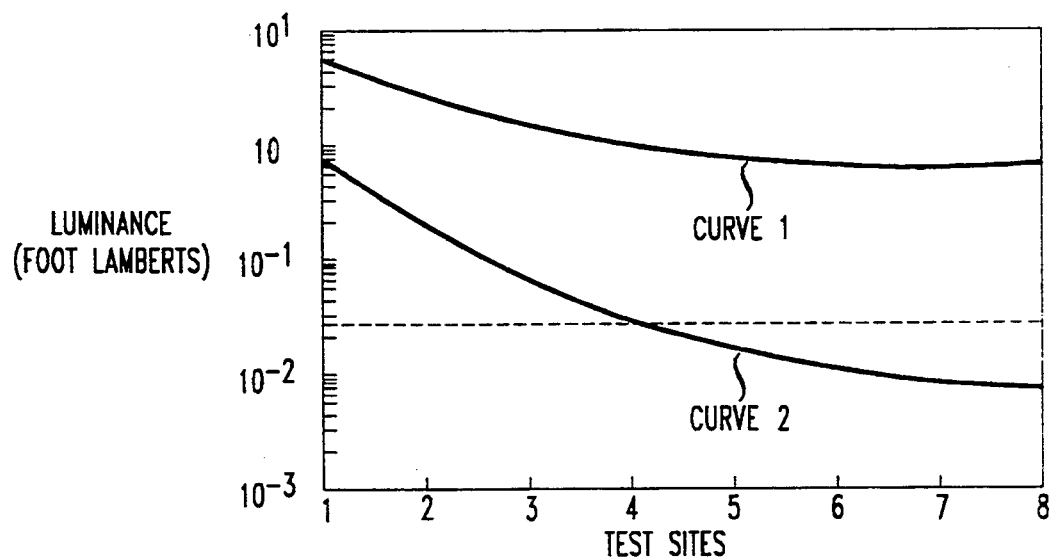
FIG. 11 is a graphical illustration comparing luminance of the FIG. 8 low light arrangement with luminance from a typical back-lit arrangement now in commercial use.

FIG. 11 is a graphical illustration comparing the luminance of the FIG. 10 arrangement (curve 1) with that of a back-lit watch purchased commercially (curve 2). The microtextured surface of the FIG. 10 arrangement used spherical segments with 30 micrometer diameter (on the substrate plane) with 35 micrometer center-to-center spacing. The segments extended to a height of about 5 micrometers above the substrate surface. The two arrangements employed the same light source. FIG. 11 shows that the FIG. 10 arrangement always exceeds the luminance required for reading (the dashed line) and shows a surprisingly enhanced luminance characteristic as compared with the commercial watch.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. An illuminating device comprising:
   a transparent substrate comprising a pair of substantially parallel major surfaces;
   one of said major surfaces comprising a plurality of spherical segments having smooth, continuous mold-formed surfaces and bases in the range 10–125 micrometers in diameter; and
   means for directing light into said substrate in a direction generally parallel to said major surfaces.

2. A device according to claim 1 wherein said major surfaces are spaced apart by a thickness of about 0.5 to 1.00 ram.

3. A device according to claim 1 further comprising a diffusing sheet disposed parallel to said major surfaces.

4. A device according to claim 1 wherein said spherical segments are coated with reflecting material.

5. A device according to claim 1 wherein said spherical segments have altitudes which are 10% to 20% of the diameters of their bases.

6. A device according to claim 1 wherein the combined areas of the spherical segment bases comprises 50 to 90% of the area of the major surface on which they are formed.

7. An illuminated display device comprising a transparent display device and an illuminating device according to claim 1 or 2 or 3 or 4 or 5 or 6.

* * * * *

UNITED STATES PATENT AND TRADEMARK OFFICE
CERTIFICATE OF CORRECTION

PATENT NO. : 5,349,503
DATED : September 20, 1994
INVENTOR(S) : Blonder et al.

It is certified that error appears in the above-indentified patent and that said Letters Patent is hereby corrected as shown below:

Column 6, claim 2, line 19, "1.00 ram" should read --1.00 mm--.

Signed and Sealed this

Twenty-third Day of May, 1995

Attest:

BRUCE LEHMAN

Attesting Officer      Commissioner of Patents and Trademarks

Disclaimer 5,349,503—Greg E. Blonder, Summit, Bertrand H. Johnson, Murray Hill, both of N.J. ILLUMINATED TRANSPARENT DISPLAY WITH MICROTEXTURED BACK REFLECTOR. Patent dated Sept. 20, 1994. Disclaimer filed May 28, 1997, by the assignee, Lucent Technologies, Inc.

Hereby enters this disclaimer to all claims of said patent.

*(Official Gazette, August 26, 1997)*